US011120140B2

(12) United States Patent
Benke et al.

(10) Patent No.: US 11,120,140 B2
(45) Date of Patent: Sep. 14, 2021

(54) SECURE OPERATIONS ON ENCRYPTED DATA

(71) Applicant: INTERNATIONAL BUSINESS MACHINES CORPORATION, Armonk, NY (US)

(72) Inventors: Oliver Benke, Stuttgart (DE); Tobias U. Bergmann, Weinstadt (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 276 days.

(21) Appl. No.: 16/019,624

(22) Filed: Jun. 27, 2018

(65) Prior Publication Data
US 2020/0004969 A1    Jan. 2, 2020

(51) Int. Cl.
G06F 21/60    (2013.01)
H04L 29/06    (2006.01)

(52) U.S. Cl.
CPC ........ *G06F 21/602* (2013.01); *H04L 63/0428* (2013.01)

(58) Field of Classification Search
None
See application file for complete search history.

(56) References Cited

U.S. PATENT DOCUMENTS

| 6,662,020 | B1 * | 12/2003 | Aaro ...................... G06Q 20/32 455/411 |
| 7,747,809 | B2 | 6/2010 | Hanscom |
| 8,925,075 | B2 | 12/2014 | Krendelev et al. |
| 8,938,622 | B2 | 1/2015 | Buehl |
| 9,053,348 | B2 | 6/2015 | Venkatesan et al. |
| 9,246,678 | B2 | 1/2016 | Nayshtut et al. |
| 9,716,696 | B2 | 7/2017 | Narayan et al. |
| 2006/0085844 | A1 * | 4/2006 | Buer ................... H04L 63/0861 726/4 |
| 2006/0090084 | A1 * | 4/2006 | Buer ..................... G06F 21/575 713/189 |
| 2011/0321173 | A1 | 12/2011 | Weston et al. |

(Continued)

FOREIGN PATENT DOCUMENTS

| KR | 20140019574 A | 2/2014 |
| WO | WO9407219 A1 | 3/1994 |

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

(Continued)

*Primary Examiner* — Kambiz Zand
*Assistant Examiner* — Arezoo Sherkat
(74) *Attorney, Agent, or Firm* — Steven Chiu, Esq.; Kevin P. Radigan, Esq.; Heslin Rothenberg Farley & Mesiti P.C.

(57) ABSTRACT

Secure operations are performed on encrypted code. A processor in a first operating mode obtains encrypted code. The processor switches from the first operating mode to a second operating mode, and decrypts the encrypted code to obtain decrypted code. The decrypted code is executed, based on the processor being in the second operating mode, to provide a result. The result is encrypted, and the encrypted result is sent to a user, based on the processor switching back to the first operating mode.

17 Claims, 12 Drawing Sheets

(56) References Cited

U.S. PATENT DOCUMENTS

| | | | |
|---|---|---|---|
| 2014/0075184 A1 | 3/2014 | Gorbach et al. | |
| 2014/0258736 A1* | 9/2014 | Merchan | G06F 21/62 713/193 |
| 2015/0052616 A1* | 2/2015 | Hutchison | G06F 21/57 726/27 |
| 2015/0058629 A1* | 2/2015 | Yarvis | H04L 63/0442 713/171 |
| 2015/0379297 A1* | 12/2015 | Hunt | G06F 21/10 726/26 |
| 2016/0149710 A1* | 5/2016 | Huxham | H04W 12/0608 713/175 |
| 2016/0261408 A1* | 9/2016 | Peddada | H04L 9/0861 |
| 2017/0010982 A1* | 1/2017 | Avanzi | G06F 12/1408 |
| 2018/0247082 A1* | 8/2018 | Durham | G06F 21/57 |

OTHER PUBLICATIONS

Vacca, John R., "Cloud Computing Security," CRC Press, Sep. 2016, pp. 1-12.

Ruan, Xiaoyu, "Platform Embedded Security Technology Revealed: Safeguarding the Future of Computing with Intel Embedded Security and Management Engine," Apress, Aug. 2014, pp. 1-16.

Costan, Victor et al., "Intel SGX Explained," 2016 (no further date information available), pp. 1-118.

Tebaa, Maha et al., "Secure Cloud Computing Through Homomorphic Encryption," International Journal of Advancements in Computing Technology (JACT), vol. 5, No. 16, Dec. 2013, pp. 29-38.

Swami, Yogesh, "Intex SGX Remote Attestation is not sufficient," Jul. 27, 2017, pp. 1-16.

Ahmad, Iram et al., "Homomorphic Encryption Method Applied to Cloud Computing," International Journal of Information & Computation Technology, vol. 4, No. 15, 2014 (no further date information available), pp. 1519-1530.

AWS, "AWS CloudHSM—User Guide," downloaded from internet Jun. 20, 2018, pp. 1-288.

AWS, "AWS CloudHSM V2—API Reference—API Version Apr. 28, 2017," downloaded from internet Jun. 20, 2018, pp. 1-48.

AWS, "AWS CLI Command Reference," https://docs.aws.amazon.com/cli/latest/reference/cloudhsmv2/index.html, downloaded Jun. 20, 2018, pp. 1-2.

* cited by examiner

SECURE OPERATIONS ON ENCRYPTED DATA

BACKGROUND

One or more aspects relate, in general, to data encryption, and in particular, to performing secure operations on encrypted data in one or more computing environments, including cloud computing environments.

Cloud computing allows customers or users to pay for the use of hardware and software resources requested on demand and provided via, for instance, the internet. The cloud provider not only provides the resources, but also provides protection of a customer's data by not allowing other customers access to the customer's data.

Since the cloud provider has access to the data, even if encrypted, trust is required in the cloud provider. For example, conventionally, if encrypted data is loaded to the cloud and the loaded encrypted data is operated on in the cloud (e.g., for report generation), the cloud service provider is able to see the processed data in clear text. This is a concern, since the service provider may be hacked by someone with malevolent intentions.

SUMMARY

Shortcomings of the prior art are overcome and additional advantages are provided through the provision of a computer program product for facilitating processing within a computing environment. The computer program product includes a computer readable storage medium readable by a processing circuit and storing instructions for performing a method. The method includes obtaining, by a processor in a first operating mode, encrypted code, the processor to execute clear text instructions based on being in the first operating mode. The processor is switched from the first operating mode to a second operating mode, the second operating mode being different from the first operating mode. Based on the processor being in the second operating mode, the encrypted code is decrypted to obtain decrypted code, and the decrypted code is executed.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with an aspect of the present invention, a capability is provided to enable secure operations (e.g., secure cloud operations) on encrypted data. In one example, the capability includes providing another operating mode, referred to herein as a second operating mode or a stealth mode, within a trusted processor in the cloud, and using the trusted processor in the other operating mode to perform secure cloud operations on encrypted data.

Figure 1A:
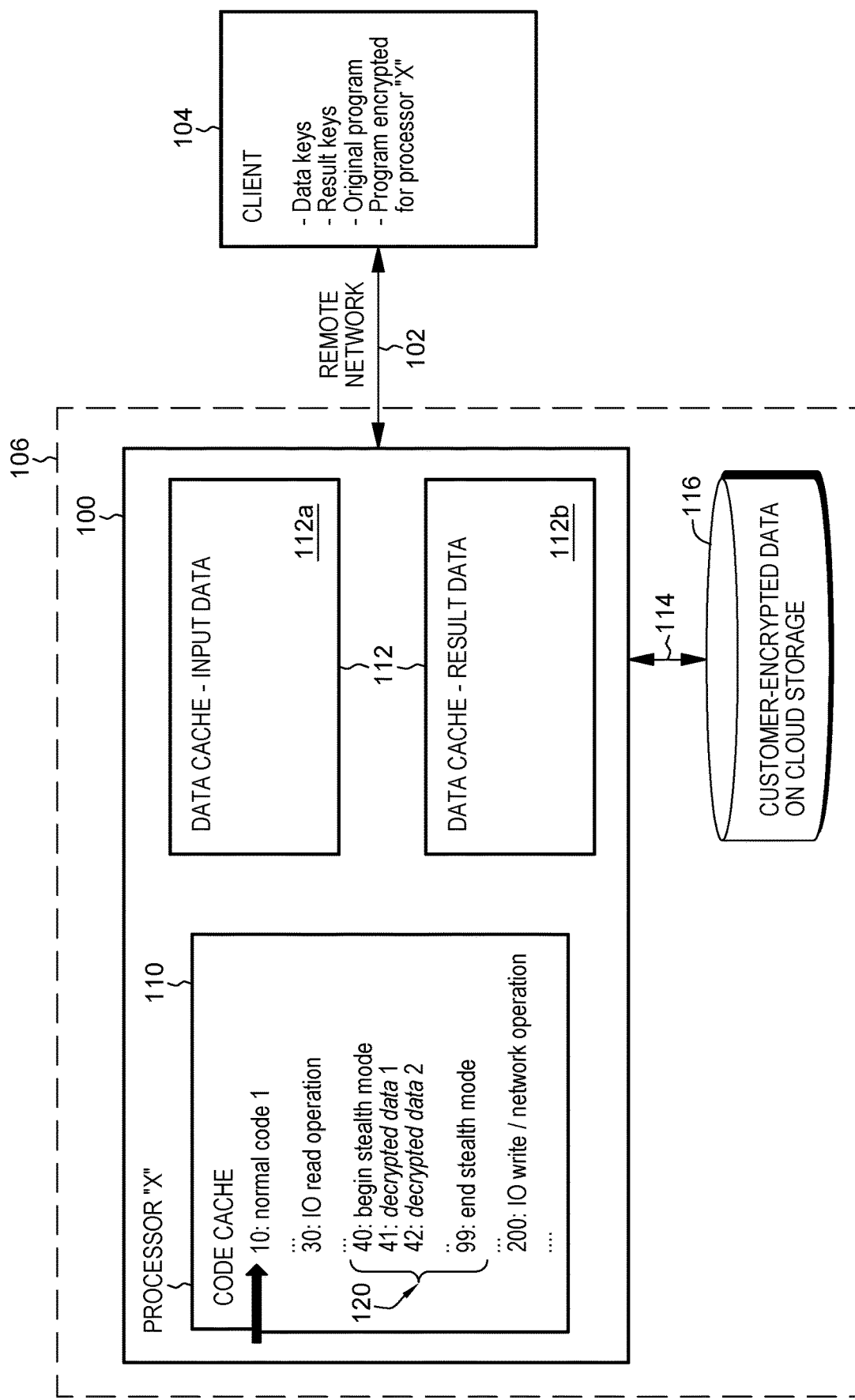
FIGS. 1A-1F depict one example of processing associated with performing secure operations on encrypted data, in accordance with an aspect of the present invention.

One example of using a trusted processor to perform secure operations on encrypted data is described with reference to FIGS. 1A-1F. Referring initially to FIG. 1A, a processor 100, referred to herein as Processor X, is coupled via a remote network 102 (e.g., the internet or other network) to a client 104 executing, e.g., on another processor. In this example, processor 100 is a trusted processor within a cloud computing environment 106, and includes at least one code cache 110 and at least one data cache 112. In this particular example, processor 100 includes a data cache 112a for input data and a data cache 112b for result data; however, other implementations are possible. Processor 100 is also coupled, via, for instance, a connection 114, to storage 116 that includes customer-encrypted data within the cloud computing environment.

In one example, code cache 110 includes, for instance, code to be executed by the processor, including, but not limited to, code segments, instructions and/or programs. For instance, in accordance with an aspect of the present invention, a stealth mode program 120 is loaded into cloud-provider processor code cache 110 for execution by processor 100. Processing of code within the code cache, including stealth mode program 120, is described with reference to FIGS. 1B-1F.

Figure 1B:
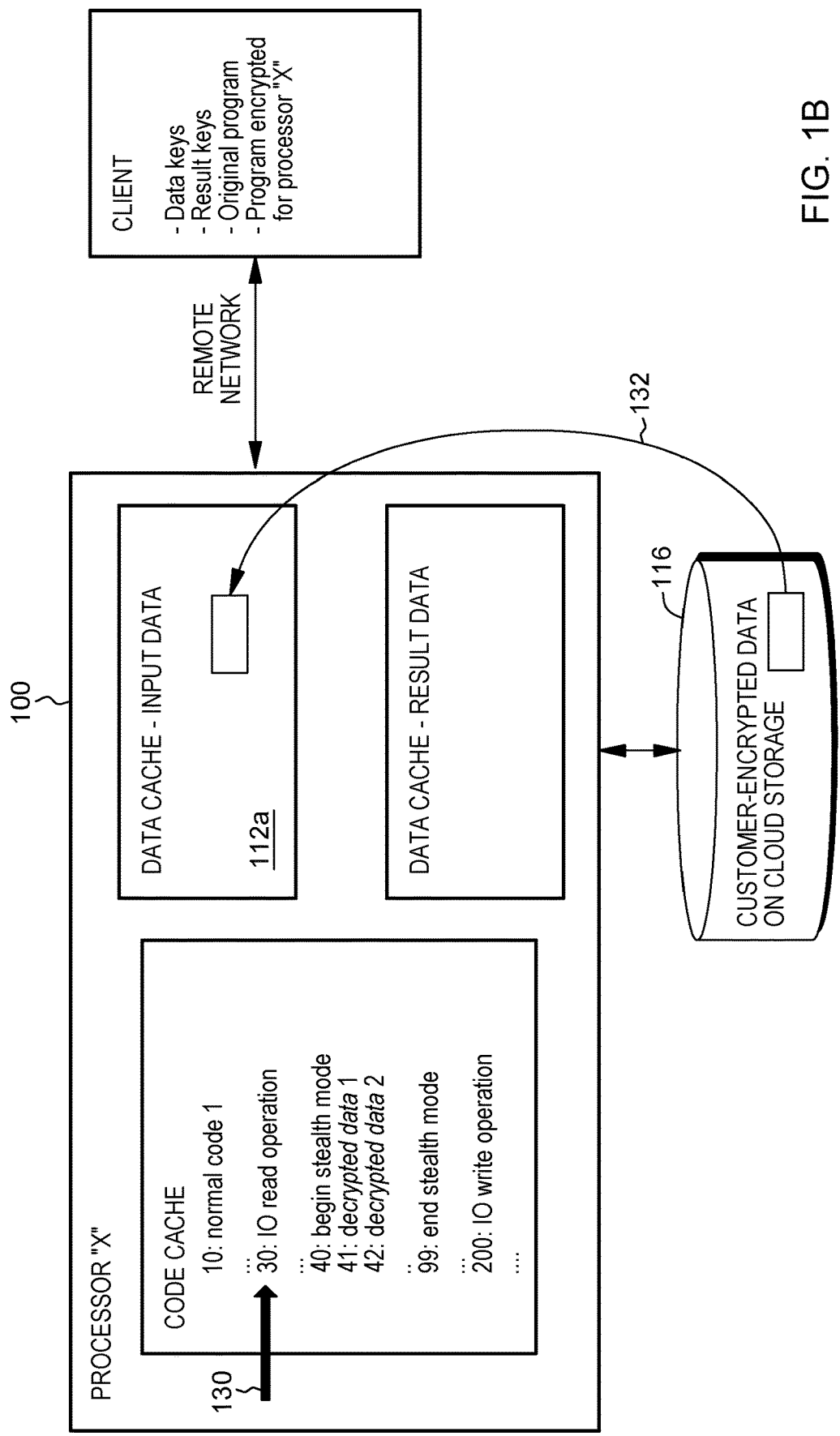
Figure 1C:
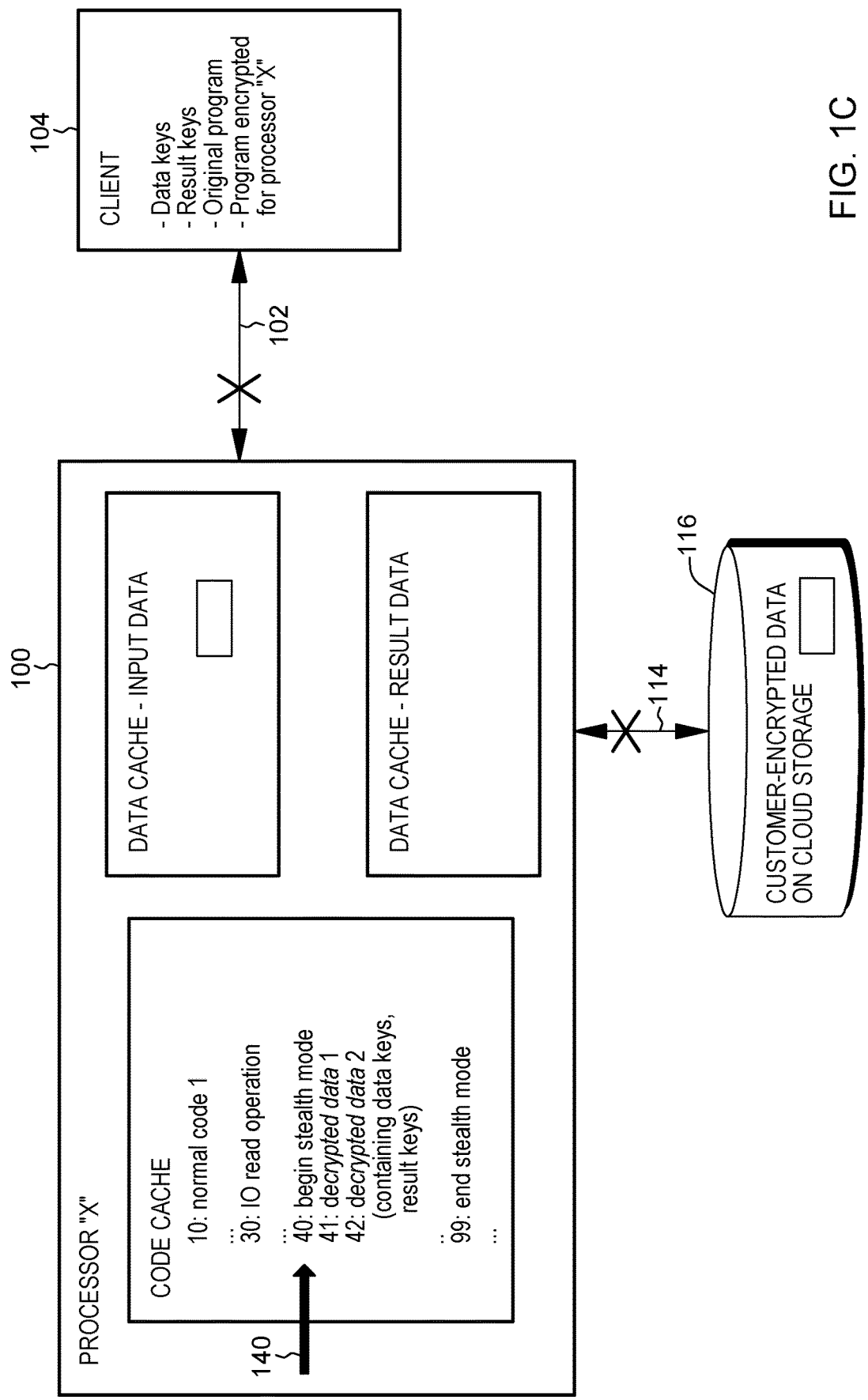

Referring to FIG. 1B, in one example, an input/output (I/O) read operation 130 is performed by processor 100 to read 132 customer-encrypted data from cloud storage 116 to input data cache 112a. Next, referring to FIG. 1C, stealth mode (also referred to as the other or second operating mode) is initiated 140 for processor 100. In stealth mode, connections between processor 100 and external components outside of the processor are disabled. For instance, the connection between processor 100 and client 104 is disabled, as well as between processor 100 and storage 116 (as shown by the X through connection 102 and connection 114). In one example, to disable the connections, the physical wires are fenced to/from the processor chip. When a fence is high, then all fenced signals are forced to GND (ground), and thus, unusable for data transmission. Since some external connections use protocols that lose synchronization when fully disconnected, it is enough to fence the data signals.

Figure 1D:
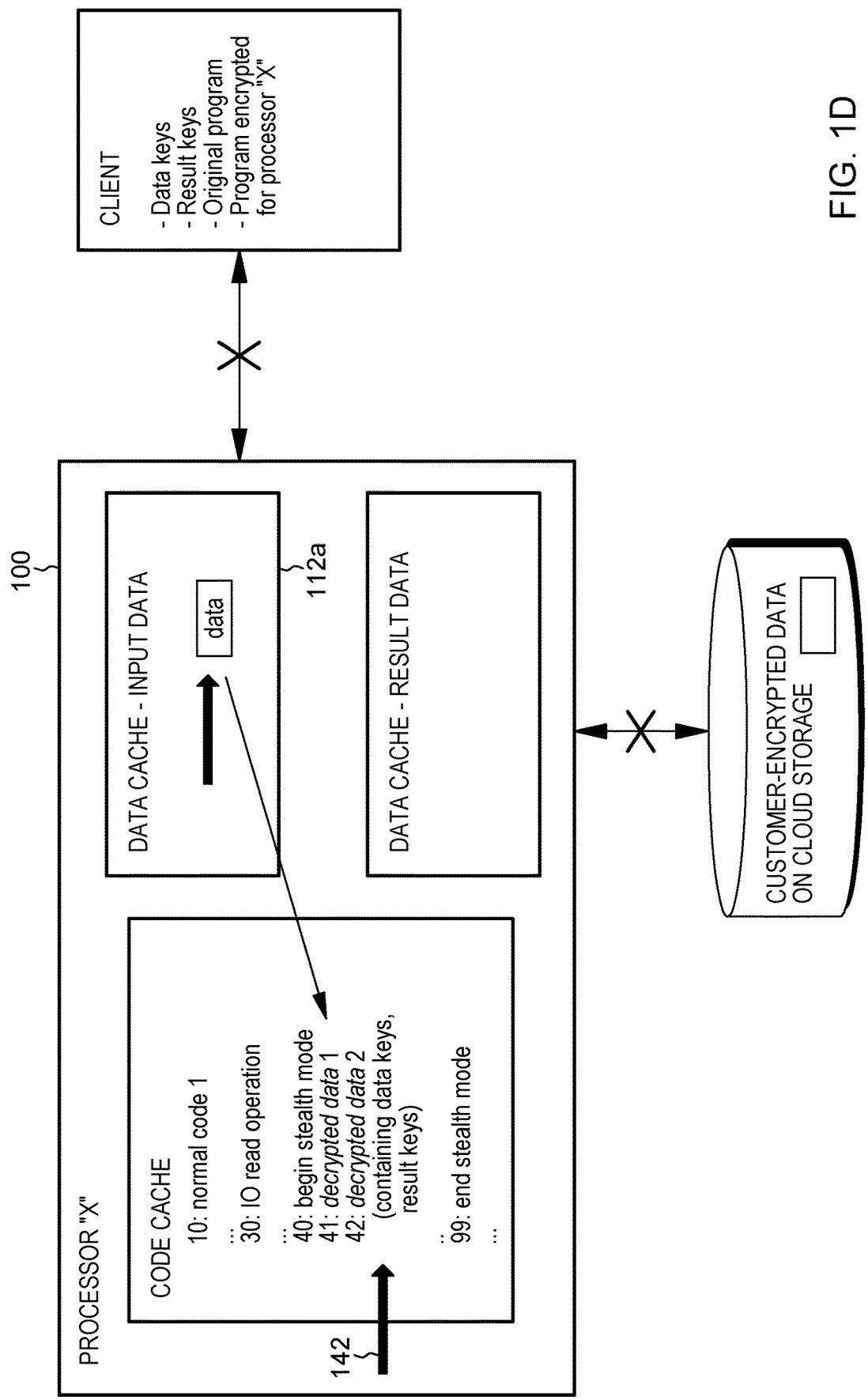
Figure 1E:
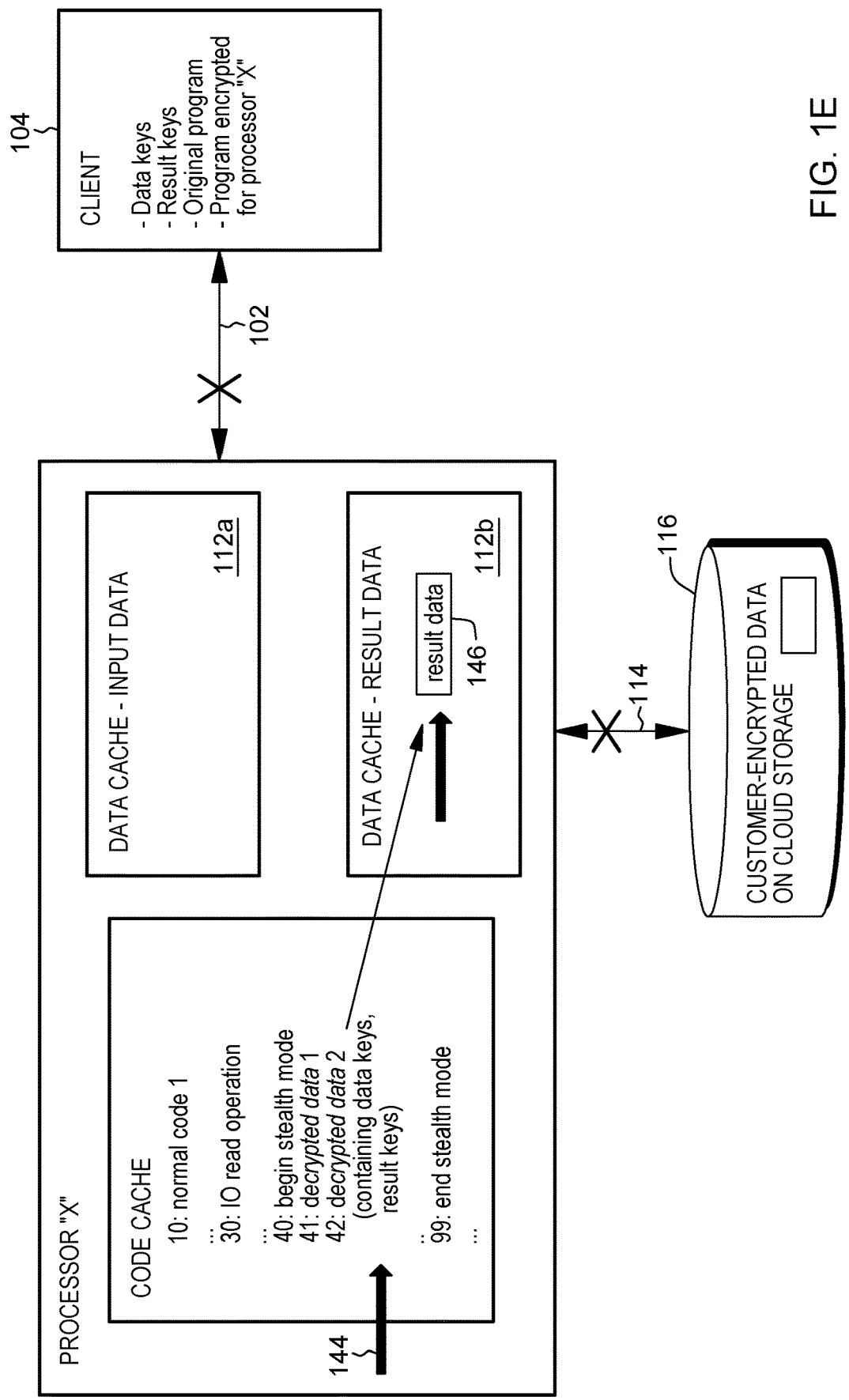
Figure 1F:
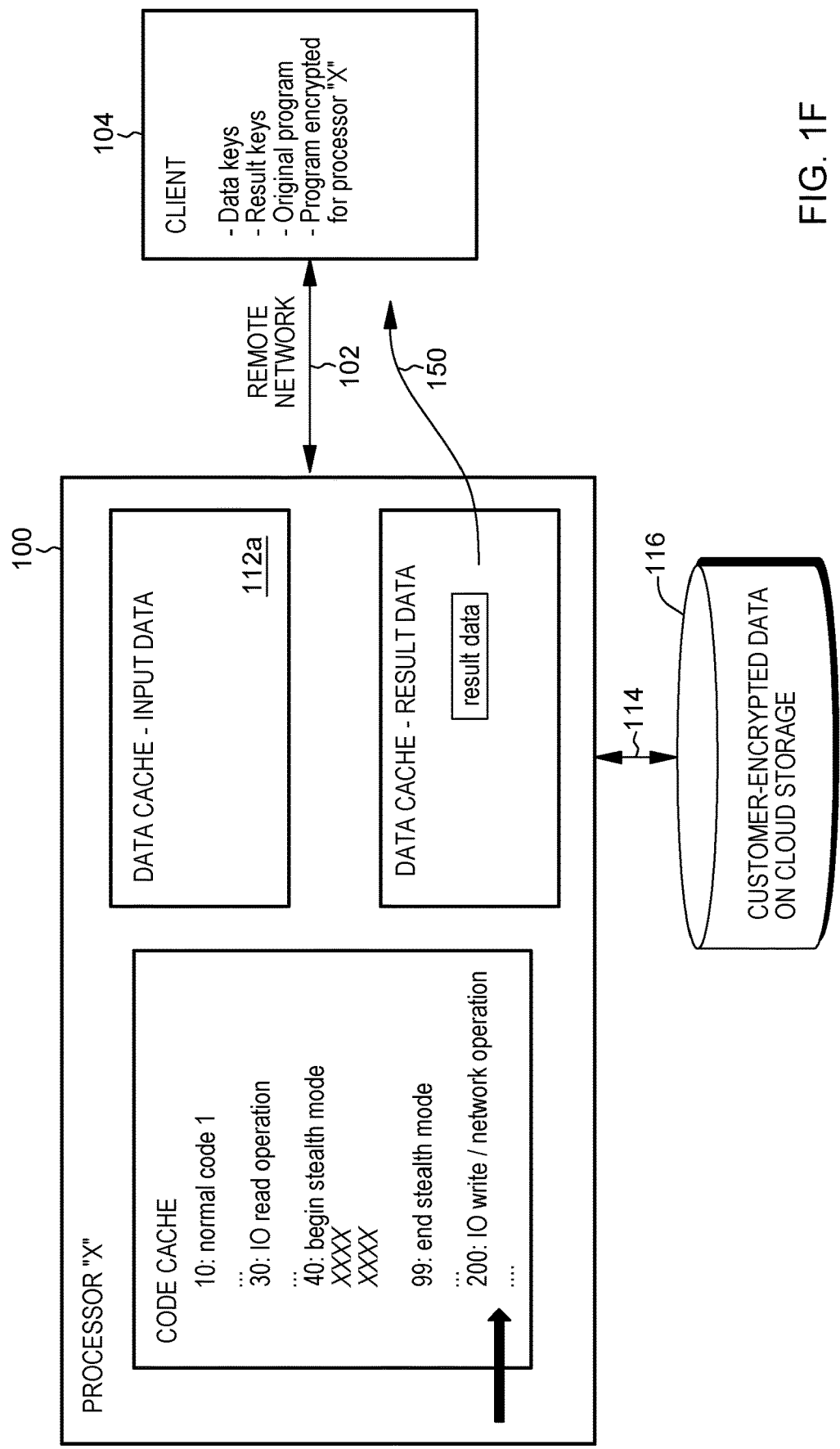

Based on being in stealth mode, as shown in FIG. 1D, the encrypted input data in data cache 112a is decrypted 142 by processor 100 and operations are performed on the decrypted data. In stealth mode, the data is decrypted, but there is no access path to the decrypted data outside of stealth mode. Then, referring to FIG. 1E, results of the operations are encrypted 144 and encrypted result data 146 is written to result cache 112b. Subsequently, stealth mode is ended. By ending stealth mode, connections to the external components, such as storage 116 and client 104 are restored, as shown by connections 102 and 114 in FIG. 1F. Further, the encrypted result data is sent 150 to client 104 via, for instance, remote network 102.

Figure 2:
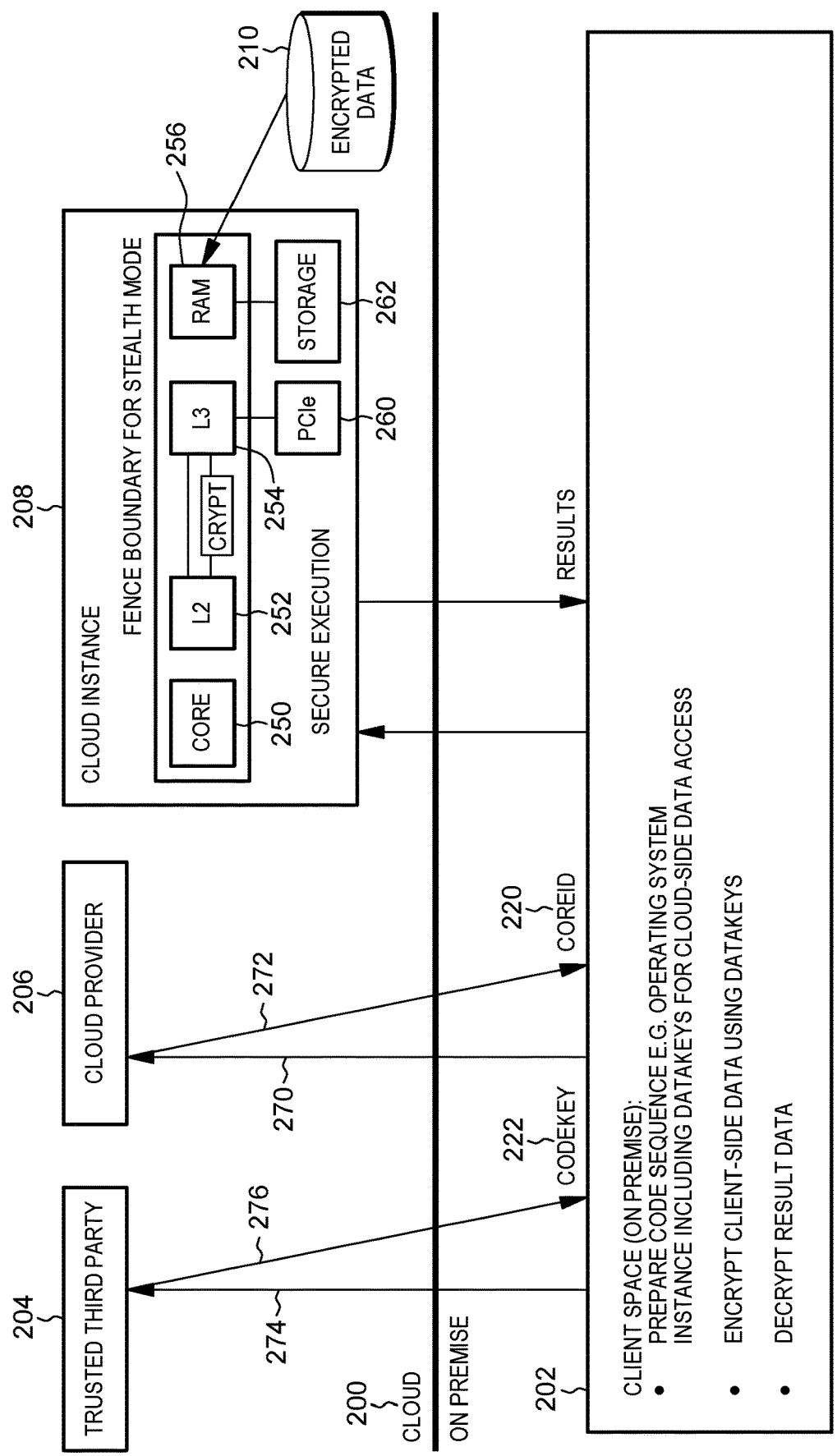
FIG. 2 depicts further details of one example of processing associated with performing secure operations on encrypted data, in accordance with an aspect of the present invention.
Figure 3B:
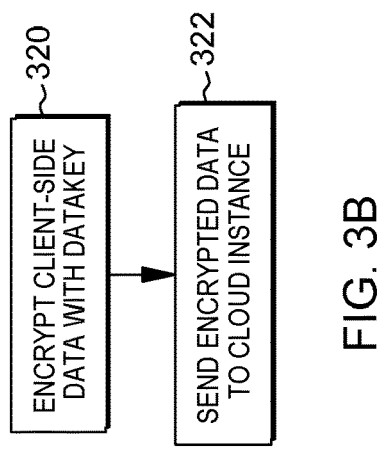
FIGS. 3A-3B depict one example of processing performed at a client to perform secure operations on encrypted data, in accordance with an aspect of the present invention.
Figure 3A:
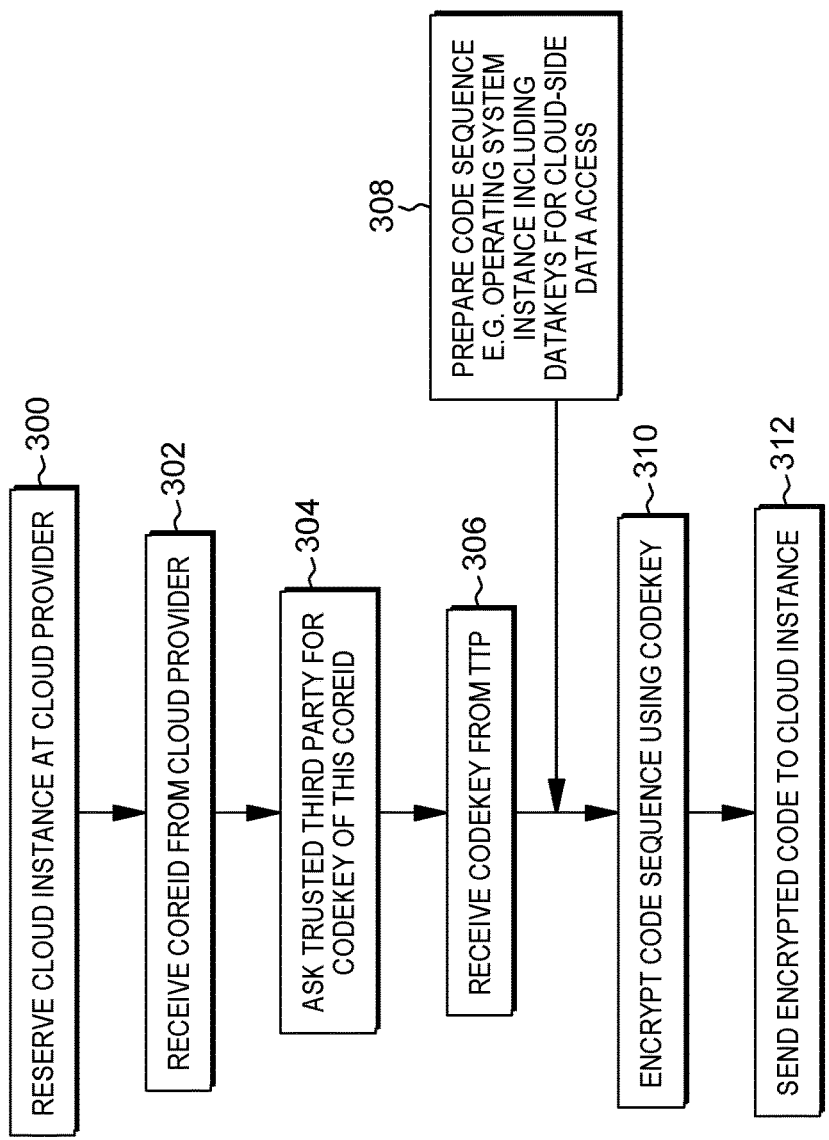
Figure 3C:
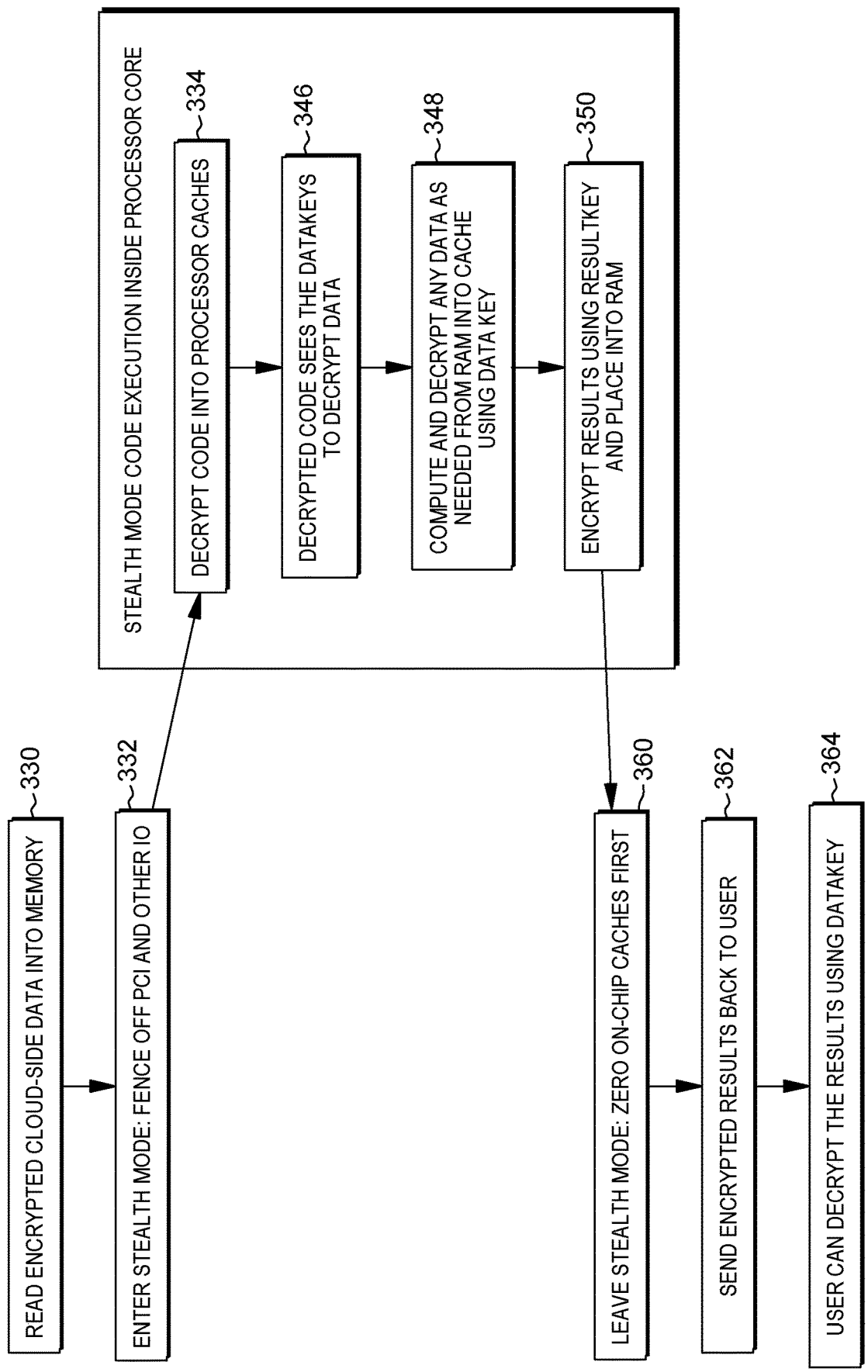
FIG. 3C depicts one example of processing performed at a cloud provider to perform secure operations on encrypted data, in accordance with an aspect of the present invention.

Further details relating to performing secure cloud operations in stealth mode are described with reference to FIG. 2 and FIGS. 3A-3C. FIG. 2 depicts one embodiment of a cloud environment using stealth mode to perform secure cloud operations on encrypted data; FIGS. 3A-3B depict one embodiment of customer processing associated with performing secure cloud operations; and FIG. 3C depicts one embodiment of cloud processing associated with performing secure cloud operations. In the following description, reference is made to FIGS. 2 and 3A-3C. Therefore, reference numbers beginning with "2" refer to FIG. 2, and reference numbers beginning with "3" refer to FIG. 3A, FIG. 3B or FIG. 3C.

Referring initially to FIG. 2, cloud environment 200 is coupled to a client 202, and includes, for instance, a plurality of entities, such as a trusted third party (TTP) 204, a cloud provider 206, a cloud instance 208, and storage 210 storing encrypted data, as examples.

Cloud instance 208 includes, for instance, a processor core 250, a plurality of caches (e.g., L2 cache 252, L3 cache 254), and a memory 256 (e.g., random access memory (RAM)). Memory 256 may include or have access to encrypted data 210. L3 cache 254 is coupled, in one example, to PCIe link 260, and memory 256 is coupled, in one example, to storage 262. In one example, core 250, L2 cache 252, L3 cache 254 and memory 256 may be fenced off for stealth mode operations in that connections to external components, such as storage 262, client processors or other components considered external to the core, are disabled. For instance, the connection from L3 cache 254 to PCIe is disabled, as well as the connection from RAM 256 to storage 262, when in stealth mode.

In one embodiment, to provide secure operations on encrypted data in a cloud environment using stealth mode, certain tasks are performed, as described with reference to FIGS. 3A-3C. Referring initially to FIGS. 2 and 3A, in one embodiment, the customer, via, e.g., a client processor (e.g., client 202), reserves 270 a cloud instance (e.g., cloud instance 208) at a cloud provider (e.g., cloud provider 206), STEP 300. Based on reserving the cloud instance, a core ID (e.g., COREID 220), which is a unique identifier of a cloud core (e.g., core 250) validated by the chip manufacturer, is provided 272 to the customer from the cloud provider. The customer receives the COREID, STEP 302, and requests 274 from a trusted third party (e.g., trusted third party 204) a code key (e.g., CODEKEY 222) of COREID 220, STEP 304. The code key is a public key of the cloud core that is provided and signed by the chip manufacturer. Based on the request, the CODEKEY is provided 276 by the trusted third party to the customer, STEP 306, and it is read into one or more of memory 256 and caches 252, 254.

Additionally, a code sequence is prepared on the client, STEP 308. The code sequence is, for instance, an operating system instance including data keys (also referred to as DATAKEYS) for cloud-side data access. The code sequence is encrypted using the code key received from the trusted third party, STEP 310. That is, the code sequence is encrypted for the specific processor reserved at the cloud provider. In one example, the code sequence is encrypted using an encryption tool provided by the manufacturer of the processor to execute the encrypted code. The tool may be distributed in open source, as an example. The encrypted code is sent to the cloud instance, STEP 312. In one embodiment, the encrypted code includes one or more keys (e.g., DATAKEYS) to decrypt private customer data at the cloud.

As examples, the encryption tool uses asymmetric encryption for the whole code sequence, or a hybrid asymmetric/symmetric encryption for performance reasons. In the first case, the complete code sequence is encrypted using the CODEKEY. In the second case, only a random key, as an example, is encrypted using the CODEKEY, and this random key is used for symmetric encryption of the code sequence. Other variations exist.

Further, with reference to FIG. 3B, client-side data is encrypted with a data key (e.g., DATAKEY), STEP 320. The data key is, for instance, a symmetric key for input data encryption provided by the client. The encrypted data is sent, via, e.g., the client processor, to the cloud instance, STEP 322.

At the cloud instance, the core switches into secure stealth mode, disables the external interfaces (e.g., external I/O interfaces) and decrypts the code. The decrypted code is executed producing results that are encrypted. The core switches back into normal mode (also referred to as a first operating mode) and destroys any unencrypted data. The encrypted results are sent back to the user. This is further described with reference to FIG. 3C.

Referring to FIG. 3C, in one embodiment, the encrypted cloud-side data (e.g., the client data that is encrypted, including the data that resides cloud-side) is read into memory (e.g., memory 256), STEP 330. Further, stealth mode is entered, in which PCI and other I/O is fenced off, STEP 332. For instance, the connections between L3 cache 254 and PCIe 260 and between RAM 256 and storage 262 are disabled. Other such connections, if any, are also disabled.

In stealth mode, the encrypted code is decrypted using, e.g., a private key unique to the processor, and the decrypted code is placed into one or more processor caches (e.g., L2 cache 252, L3 cache 254 and/or other caches), STEP 334. The decrypted code sees the data keys that were included in the code and to be used to decrypt the data, STEP 346. Data, if any, is obtained from memory 256 and decrypted using one or more of the data keys. Further, one or more computations are performed on the decrypted data using the decrypted code providing results, STEP 348. The results are encrypted using a result key (e.g., RESULTKEY), which is a symmetric key for result data encryption provided by the client, and the encrypted results are placed, e.g., in memory (e.g., RAM 256), STEP 350.

Subsequent to placing the encrypted results in memory, the on-chip caches are zeroed and stealth mode is exited, STEP 360. The encrypted results are sent back to the customer (also referred to as user), STEP 362. The user may decrypt the results using the data key, STEP 364. Other implementations are possible.

As described herein, a capability is provided to enable secure operations (e.g., secure cloud operations) on encrypted data. In one example, a processor operating in a first operating mode, in which it may execute plain or clear text instructions, may be switched to a second operating mode, in which communications between the processor and external components are disabled. In the second operating mode, the processor may decrypt encrypted code and/or encrypted data, and execute the decrypted code. One or more operations are performed, in one example, on the decrypted data using the decrypted code to provide a result. The result is encrypted and sent to the user, after switching the processor from the second operating mode back to the first operating mode. This capability enables secure operations to be performed, in that a cloud service provider, for example, may not duplicate, for instance, an unlocked claim key, allowing the cloud service provider to decrypt cloud stored customer data. Execution with the processor is fenced off from the rest of the environment to avoid malicious data stealing. One or more aspects of the invention avoid additional attack vectors that may cause corruption.

One or more aspects allow a customer to store encrypted private data remotely, at a cloud provider, and operate on the encrypted private data using cloud provider-owned services, generating encrypted results to be transferred back to the customer. The cloud provider is not capable of looking at the decrypted private data, even if the cloud provider has all privileges. Thus, trust is not required in the cloud provider, operators, operating system or a system software; however, there is to be trust in the manufacturer of the processor.

As described herein, in one or more aspects, a public key is obtained of a cloud-provider processor. Code is encrypted for that specific processor so that only that processor may decrypt the code. The processor has a second operating mode, referred to herein as a stealth mode, in which it cannot communicate to external devices during that mode. For instance, the PCIe bus is deactivated while in the second operating mode. The processor decrypts code in, e.g., execute-only mode, if in the second operating mode. Keys to decrypt cloud data can be part of the encrypted code. As examples, code cache lines are decrypted, if loading into an on-chip cache, and data is, e.g., only decrypted in on-chip cache.

The processor being placed in stealth mode contains a unique key fused during manufacturing. The processor manufacturer maintains a database of those keys, in one embodiment.

In one aspect, only the data owner with a private data key is capable of compiling new software capable to operate on the encrypted data in the cloud. The key to decrypt data is only visible within the processor core during stealth-mode execution. It is possible to keep the data keys outside the cloud data center reach, and still operate on the decrypted data.

The data keys and result keys are, in one embodiment, kept private by the data owner, nevertheless the cloud provider is capable to operate on the data using those data keys. There is trust in the hardware vendor, but trust in the cloud service provider is not required. In one aspect, the stealth-mode software component is custom built for a specific chip. For instance, the stealth-mode software components are specialized for processors that support stealth mode. By encrypting with a specific CODEKEY of a specific processor core, the code is targeted at, e.g., exactly this core.

In a further aspect, one or more aspects may be used in a multi-processing system (e.g., symmetrical multi-processing system (SMP)), in which for a multi-processing enabled application, the processor can duplicate execute-only mode pages to other cores on the same multi-processing system. Each core has public keys of the other SMP cores, and therefore, the ability to re-encrypt the target public key.

Other embodiments, variations and implementations are possible. The foregoing description is just one example of embodiments of the invention, and variations, modifications and/or substitutions thereof are possible.

One example of a usage scenario in which one or more aspects of the present invention are employed includes, for instance: A customer downloads input data in an encrypted format to a cloud service provider. The cloud service provider stores the data, but cannot decrypt it. The customer buys trusted compute resources at the cloud service provider. The cloud service provider reserves a time slot at a given server with a given CPU (core) by a given manufacturer and informs the customer of the ID/public key of the core on which the trusted program is to be executed. The customer verifies that the given manufacturer has manufactured a CPU with the given ID/public key. The customer uses an encryption tool provided by the CPU manufacturer to encrypt the secure code module which contains keys suitable to decrypt the private data. The encryption tool may be distributed in open source. The customer sends the partially encrypted program to the cloud service provider. The cloud service provider submits the secure program to the given CPU that has a corresponding private key. The private key never leaves the CPU hardware; secret keys from the customer are, e.g., not outside the Ln cache or memory of the CPU. After program execution, the CPU has a pointer to the encrypted result, which can be transferred to somewhere accessible by the customer.

In further aspects, in order to prevent extended analysis capabilities by replay attacks by the cloud service provider, time-stamps may be used to eliminate replay attacks. Further, if a core has been found compromised, its key is removed from the trusted third party, and thus, the core is not able to get further tasks assigned to it.

Another usage scenario includes, for instance:

Load data to cloud:
encrypt the data using KEY3 (a cloud client data key)
store the encrypted data at the cloud.
Run report on the data in the cloud: encrypt program fragment like the following with KEY2 (associated with public key—processor has public key pair <KEY1, KEY2>, KEY1 is private—built into processor during manufacturing, not copied by manufacturer; stays inside processor core, only usable for decryption of execute-only blocks and potentially to do a signature decryption of execute-only blocks and potentially to do a signature; KEY2 is associated public key):
fetch block from storage (e.g., operating system (OS) API call, with OS service being untrusted/provided and updated by cloud service provider)
switch to stealth-mode. Decrypt secure code sequence. In this example, the program code is execute-only
decrypt data in, e.g., L2 and/or L3 cache using hardware instruction, using KEY3, which is part of the encrypted/execute-only program
potentially decrypt additional string constants from cloud service (network, storage)
run report
encrypt results using KEY3
sign by processor using KEY1 (private key built into processor during manufacturing)
leave stealth-mode. This step destroys, e.g., all unencrypted data use untrusted OS API call to send back encrypted result data to cloud client (but this untrusted service only transports encrypted data)

The cloud service provider/used hypervisor/used OS does not see any unencrypted data KEY3 cannot, in one example, be read by any processor operation, and does not leave, e.g., the L2/L3 caches.

In contrast to hardware appliances in, e.g., a VPN cloud, the keys are not part of a cloud infrastructure, but kept on premise. This allows backup/disaster recovery of keys, and facilitates destroying keys on-premise, if data is no longer needed.

There is no need to trust installed cloud software base, and aspects are more flexible and faster than, e.g., homomorphic encryption.

In yet a further aspect, whole memory encryption is used which employs, e.g., KEY3, which is to be stored to a write-only special register of the processor (with multiple register entries for concurrent context, if multiple protected virtual instances are to be executed at the same time). Before entering stealth mode, the application ensures that each library is available in encrypted memory. Further, the application does not invoke any API (libc, operating system, database, . . . ) any longer until entering stealth mode. Data loaded from cloud storage is decrypted using KEY3 and a special processor instruction. After entering stealth mode (with special register instruction), processor I/O (PCI express, north bridge, . . . ) is powered off. Now, it is possible to do some report generation using untrusted APIs within encrypted memory. The result is to be brought in to special pages, to be returned using the KEY3 crypto key again. If the used service requires writing a log or a trace, it is written to an encrypted RAM disk (which might just be disposed later on) before exiting stealth mode. The KEY3 key is null'd, so the application loses the ability to decrypt data stored in the cloud or to decrypt the result records generated. Now, all it can do is send back the encrypted result and terminate, in one embodiment.

In a further aspect, a complete SMP enters stealth mode at the same time. If multiple workloads are running concurrently, this reduces possible utilization of cloud servers; however, it does not eliminate the possibility to run virtualized. Optionally, fencing per core instead of per chip would be possible by tracking the core-id of each memory and I/O transfer. The fencing logic is to be aware which core-ids to fence at which point in time.

One or more aspects of the present invention are inextricably tied to computer technology and facilitate processing within a computer, improving security and performance thereof. In one or more aspects, secure operations (e.g., secure cloud operations) are efficiently performed on encrypted data in a cloud environment, enabling the use of encrypted data in cloud environments.

In one or more aspects, a processor in a first operating mode can execute clear text instructions. The processor in the first operating mode obtains encrypted code, and switches from the first operating mode to a second operating mode, the second operating mode being different from the first operating mode. Based on the processor being in the second operating mode, the encrypted code is decrypted to obtain decrypted code, and the decrypted code is executed.

As one example, the switching the processor from the first operating mode to the second operating mode includes deactivating one or more communication connections of the processor to external components of the processor to place the processor in the second operating mode.

In one aspect, the executing the decrypted code includes performing one or more operations using the decrypted code to provide a result. The result is encrypted to provide an encrypted result, and the encrypted result is provided to a client, based on the processor switching from the second operating mode to the first operating mode. The switching from the second operating mode to the first operating mode enables communications from the processor to external components of the processor. The switching includes, for instance, deleting unencrypted data from one or more caches of the processor.

In a further aspect, input data is decrypted to provide decrypted data, and the one or more operations are performed on the decrypted data to provide the result. As an example, the decrypting the input data includes using at least one data key, the at least one data key being provided by the decrypted code.

As an example, the decrypting the encrypted code includes decrypting the encrypted code using a private key unique to the processor. Further, as an example, the encrypted code is encrypted using a public key associated with a unique identifier of the processor.

Yet further, in one aspect, the processor is provided by a cloud service provider. The processor is provided, by the cloud service provider, in one example, based on a request for the processor. A unique identifier of the processor and a public key associated with the unique identifier of the processor are provided, and the public key is used to encrypt code to provide the encrypted code. The encrypted code is sent to the processor.

Other variations and embodiments are possible.

As described herein, one or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
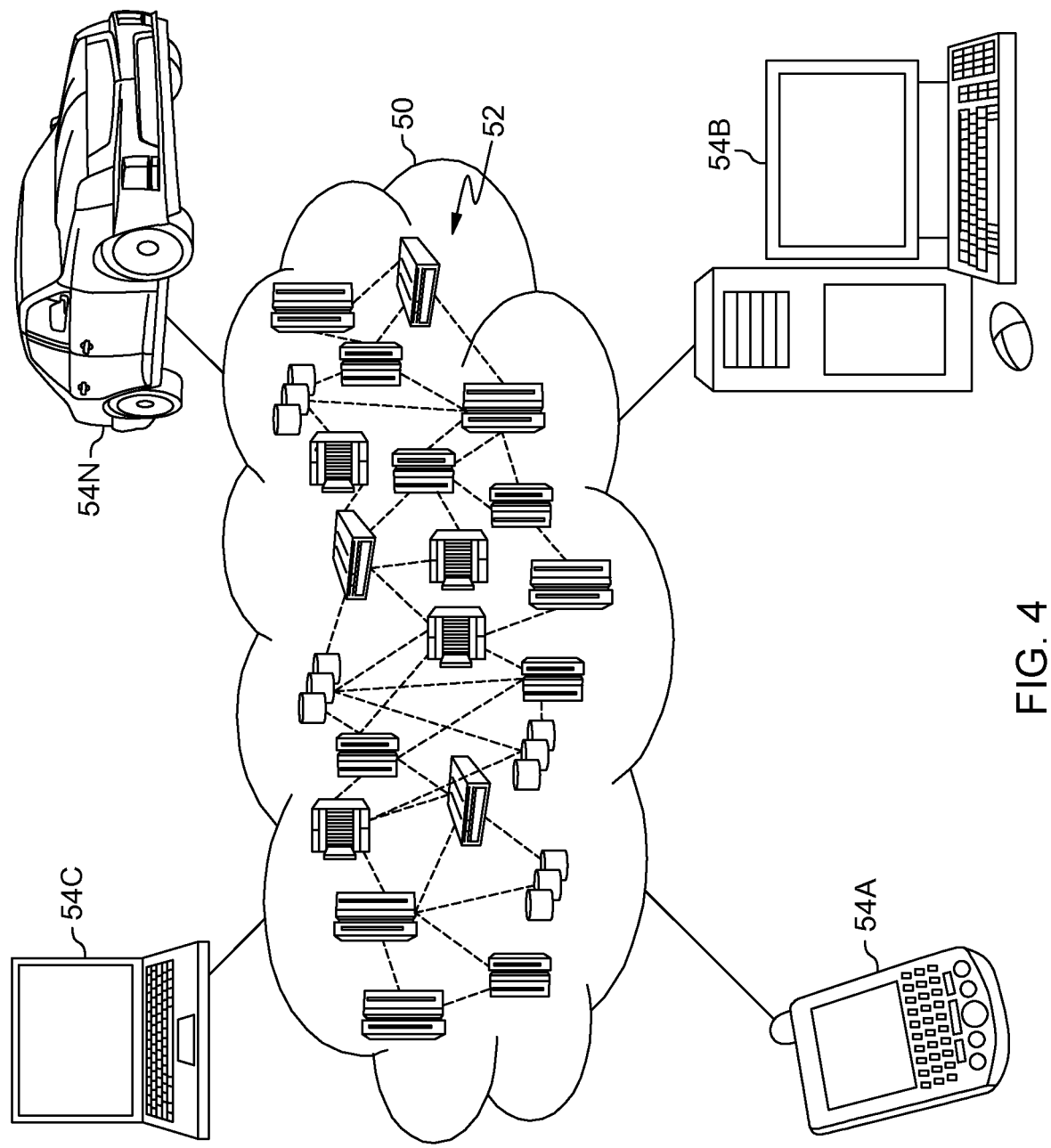
FIG. 4 depicts one embodiment of a cloud computing environment.

Referring now to FIG. 4, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 52 and cloud computing environment 50 can communicate with any type of computerized device over any type of network and/or network addressable connection (e.g., using a web browser).

Figure 5:
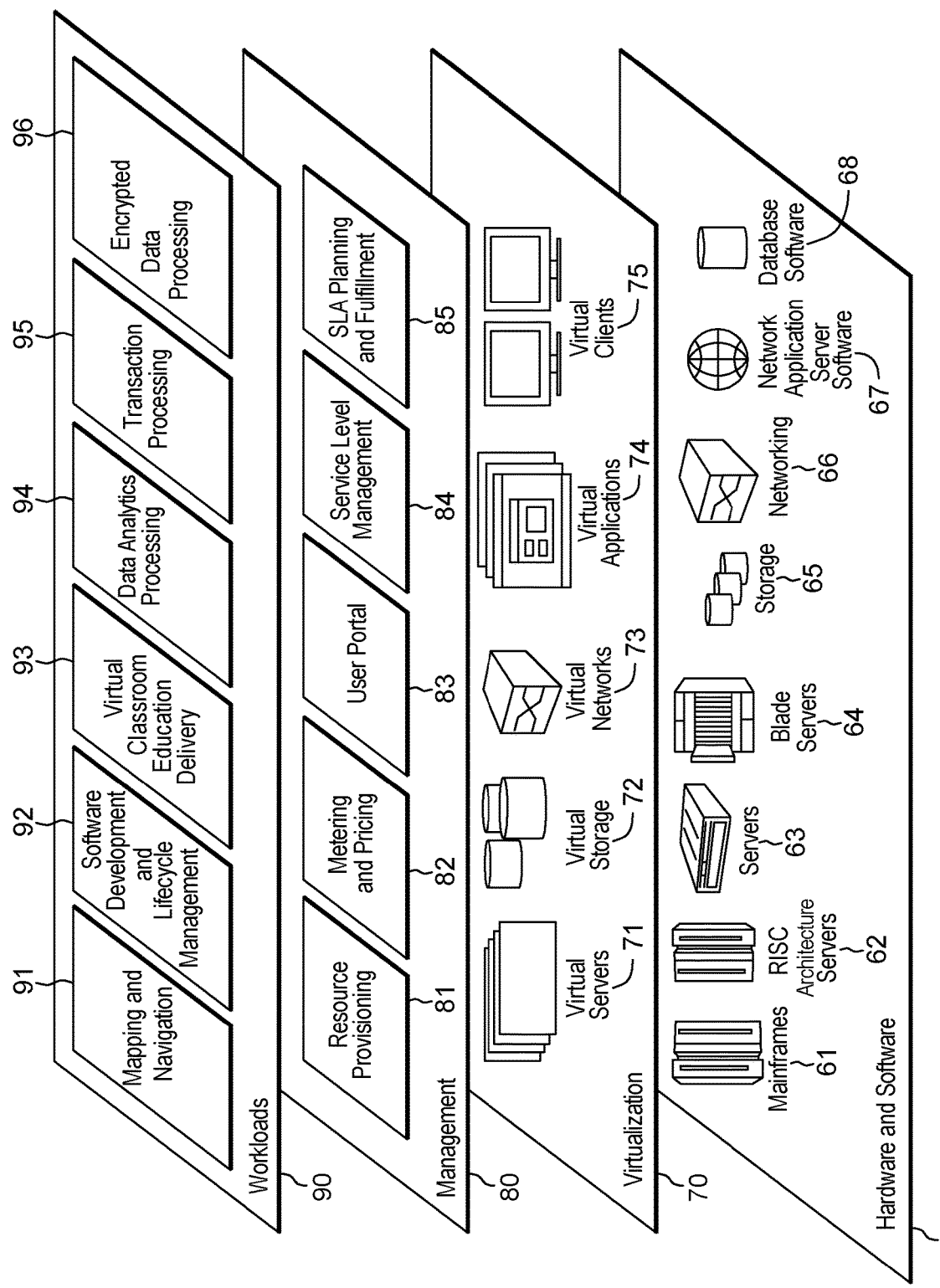
FIG. 5 depicts one example of abstraction model layers.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and encrypted data processing 96.

Figure 6:
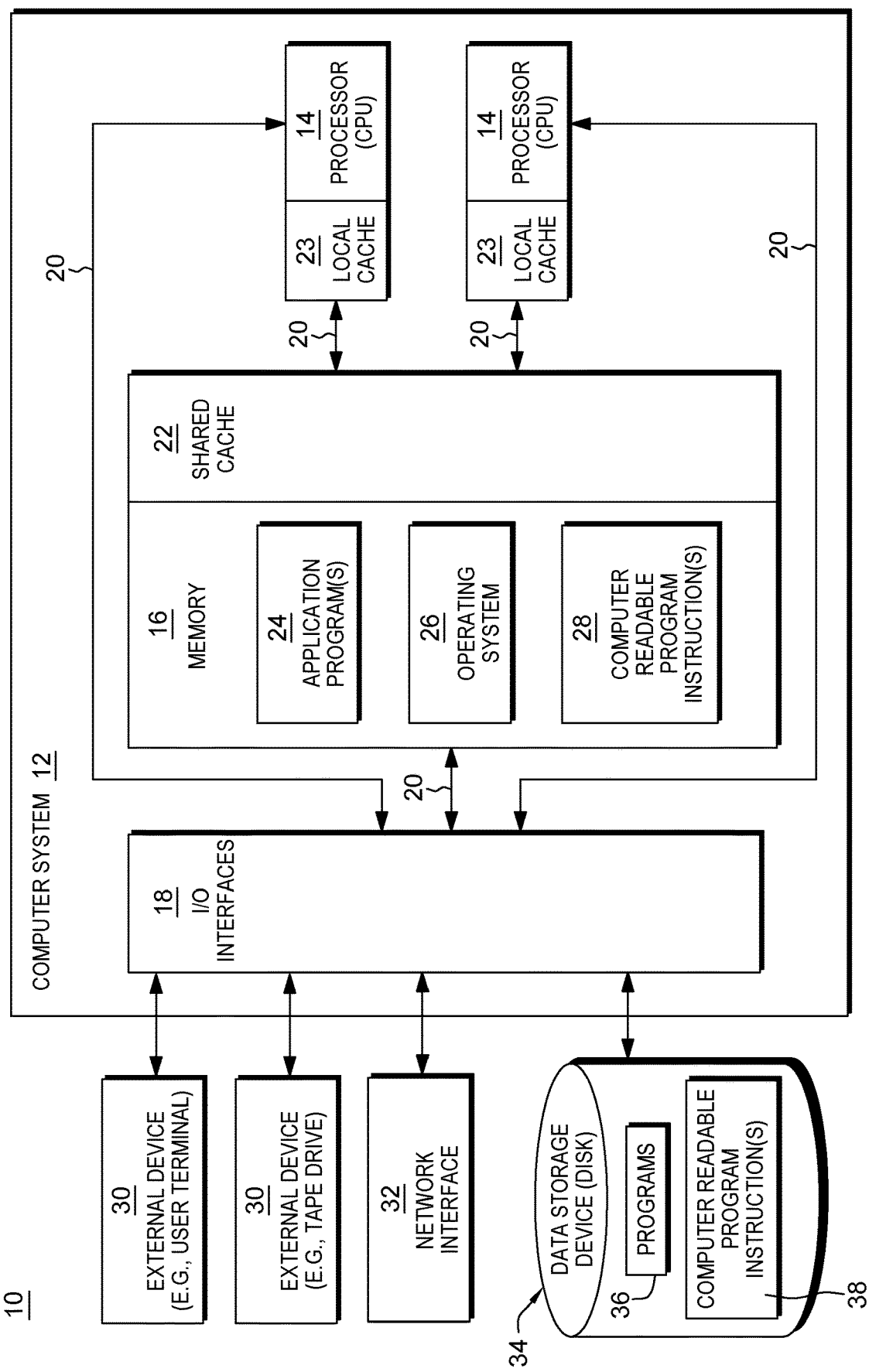
FIG. 6 depicts one example of a computing environment to incorporate and use one or more aspects of the present invention.

In addition to the above, in one example, client 104 may execute on many types of processors. Further, in one example, one or more of the processors described herein may be part of a computing environment, an example of which is described with reference to FIG. 6. As shown in FIG. 6, a computing environment 10 includes, for instance, a computer system 12 shown, e.g., in the form of a general-purpose computing device. Computer system 12 may include, but is not limited to, one or more processors or processing units 14 (e.g., central processing units (CPUs)) that may execute, e.g., one or more clients, a memory 16 (a.k.a., system memory, main memory, main storage, central storage or storage, as examples), and one or more input/output (I/O) interfaces 18, coupled to one another via one or more buses and/or other connections 20.

Bus 20 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 16 may include, for instance, a cache 22, such as a shared cache, which may be coupled to local caches 23 of processors 14. Further, memory 16 may include one or more programs or applications 24, an operating system 26, and one or more computer readable program instructions 28. Computer readable program instructions 28 may be configured to carry out functions of embodiments of aspects of the invention.

Computer system 12 may also communicate via, e.g., I/O interfaces 18 with one or more external devices 30, one or more network interfaces 32, and/or one or more data storage devices 34. Example external devices include a user terminal, a tape drive, a pointing device, a display, etc. Network interface 32 enables computer system 12 to communicate with one or more networks, such as a local area network (LAN), a general wide area network (WAN), and/or a public network (e.g., the Internet), providing communication with other computing devices or systems.

Data storage device 34 may store one or more programs 36, one or more computer readable program instructions 38, and/or data, etc. The computer readable program instructions may be configured to carry out functions of embodiments of aspects of the invention.

Computer system 12 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 12. Examples, include, but are not limited to: microcode, device drivers, redundant processing units, external disk drive arrays, RAID systems, tape drives, and data archival storage systems, etc.

Computer system 12 may be operational with numerous other general purpose or special purpose computing system environments or configurations. Examples of well-known computing systems, environments, and/or configurations that may be suitable for use with computer system 12 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other computing environments can be used to incorporate and use one or more embodiments. Further, many types of encryption and decryption may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   at least one computer readable storage medium readable by at least one processing circuit and storing instructions for performing a method comprising:
      obtaining, by a processor in a first operating mode, encrypted code, the processor to execute clear text instructions based on being in the first operating mode;
      switching the processor from the first operating mode to a second operating mode, the second operating mode being different from the first operating mode, wherein the switching the processor from the first operating mode to the second operating mode includes deactivating one or more communication connections of the processor to external components of the processor to place the processor in the second operating mode, and the deactivating the one or more communication connections of the processor to external components of the processor to place the processor in the second operating mode comprises fencing physical wires to and from the processor to fence data signals to and from the processor;
      decrypting the encrypted code to obtain decrypted code, based on the processor being in the second operating mode;
      executing the decrypted code, based on the processor being in the second operating mode; and
      ending the second operating mode, the ending the second operating mode including restoring the one or more communications connections of the processor placing the processor in the first operating mode.

2. The computer program product of claim 1, wherein the executing the decrypted code comprises:
   performing one or more operations using the decrypted code to provide a result;
   encrypting the result to provide an encrypted result; and
   providing the encrypted result to a client, based on the processor switching from the second operating mode to the first operating mode.

3. The computer program product of claim 2, wherein the ending the second operating mode includes switching from the second operating mode to the first operating mode enabling communications from the processor to external components of the processor, the switching including deleting unencrypted data from one or more caches of the processor.

4. The computer program product of claim 2, wherein the method further comprises decrypting input data to provide decrypted data, and wherein the one or more operations are performed on the decrypted data to provide the result.

5. The computer program product of claim 4, wherein the decrypting the input data comprises using at least one data key for decrypting the input data, the at least one data key being provided by the decrypted code.

6. The computer program product of claim 1, wherein the decrypting the encrypted code comprises decrypting the encrypted code using a private key unique to the processor.

7. The computer program product of claim 1, wherein the encrypted code is encrypted using a public key associated with a unique identifier of the processor.

8. The computer program product of claim 1, wherein the processor is provided by a cloud service provider.

9. The computer program product of claim 8, wherein the method further comprises:
   providing, by the cloud service provider, based on a request for the processor, a unique identifier of the processor and a public key associated with the unique identifier of the processor;
   encrypting code using the public key to provide the encrypted code; and
   sending the encrypted code to the processor.

10. A computer system for facilitating processing within a computing environment, the computer system comprising:
    a memory; and
    a processor in communication with the memory, wherein the computer system is configured to perform a method, said method comprising:
       obtaining, by the processor in a first operating mode, encrypted code, the processor to execute clear text instructions based on being in the first operating mode;
       switching the processor from the first operating mode to a second operating mode, the second operating mode being different from the first operating mode, wherein the switching the processor from the first operating mode to the second operating mode includes deactivating one or more communication connections of the processor to external components of the processor to place the processor in the second operating mode, and the deactivating the one or more communication connections of the processor to external components of the processor to place the processor in the second operating mode comprises fencing physical wires to and from the processor to fence data signals to and from the processor;
       decrypting the encrypted code to obtain decrypted code, based on the processor being in the second operating mode;
       executing the decrypted code, based on the processor being in the second operating mode; and
       ending the second operating mode, the ending the second operating mode including restoring the one or more communications connections of the processor placing the processor in the first operating mode.

11. The computer system of claim 10, wherein the executing the decrypted code comprises:
    performing one or more operations using the decrypted code to provide a result;
    encrypting the result to provide an encrypted result; and
    providing the encrypted result to a client, based on the processor switching from the second operating mode to the first operating mode.

12. The computer system of claim 10, wherein the encrypted code is encrypted using a public key associated with a unique identifier of the processor.

13. The computer system of claim 10, wherein the processor is provided by a cloud service provider.

14. A computer-implemented method of facilitating processing within a computing environment, the computer-implemented method comprising:
  obtaining, by a processor in a first operating mode, encrypted code, the processor to execute clear text instructions based on being in the first operating mode;
  switching the processor from the first operating mode to a second operating mode, the second operating mode being different from the first operating mode, wherein the switching the processor from the first operating mode to the second operating mode includes deactivating one or more communication connections of the processor to external components of the processor to place the processor in the second operating mode, and the deactivating the one or more communication connections of the processor to external components of the processor to place the processor in the second operating mode comprises fencing physical wires to and from the processor to fence data signals to and from the processor;
  decrypting the encrypted code to obtain decrypted code, based on the processor being in the second operating mode;
  executing the decrypted code, based on the processor being in the second operating mode; and
  ending the second operating mode, the ending the second operating mode including restoring the one or more communications connections of the processor placing the processor in the first operating mode.

15. The computer-implemented method of claim 14, wherein the executing the decrypted code comprises:
  performing one or more operations using the decrypted code to provide a result;
  encrypting the result to provide an encrypted result; and
  providing the encrypted result to a client, based on the processor switching from the second operating mode to the first operating mode.

16. The computer-implemented method of claim 14, wherein the encrypted code is encrypted using a public key associated with a unique identifier of the processor.

17. The computer-implemented method of claim 14, wherein the processor is provided by a cloud service provider.

\* \* \* \* \*